United States Patent [19]

Danell et al.

[11] 3,732,499

[45] May 8, 1973

[54] METHOD FOR TRANSMITTING PULSE LIKE SIGNALS

[75] Inventors: Curt Danell, Huddinge; Peder Magnus Rodhe, Stockholm, both of Sweden

[73] Assignee: Telefonaktiebolaget LM Ericsson, Stockholm, Sweden

[22] Filed: May 20, 1971

[21] Appl. No.: 145,408

[30] Foreign Application Priority Data

June 12, 1970 Sweden ............................8170/1970

[52] U.S. Cl. ....................328/165, 328/21, 328/164, 325/42

[51] Int. Cl. ..............................................H04b 15/00

[58] Field of Search ......................................307/268; 328/164–165, 37, 21, 108; 325/65, 377–379, 477; 331/37

[56] References Cited

UNITED STATES PATENTS 3,184,685 5/1965 Funk ......................................328/37

*Primary Examiner*—Herman Karl Saalbach
*Assistant Examiner*—R. E. Hart
*Attorney*—Hane, Baxley & Spiecens

[57] ABSTRACT

This invention relates to a method of processing pulse like signals at the transmitter and receiver ends of a transmission medium so that the slope of the flanks of the transmitted pulses exceeds those transmittable by known methods by a medium with a limited band width. This is achieved by superposing overshoots on the pulses at the transmitter end of the transmission medium. These overshoots which have a frequency within the transmission band of the medium and consequently can be transmitted undistorted by the medium contain information about the slope of the flanks and amplitude of the original pulses at the transmitter end. These overshoots are then separated from the transmitted distorted pulses at the receiver end and a reshaping of the pulses is accomplished upon which frequency components are obtained from the overshoots, the amplitude and the time- and phase position of which have such values that the frequency components together with the transmitted distorted pulses form new pulses which well conform to the original pulses.

6 Claims, 3 Drawing Figures

Figure 1:
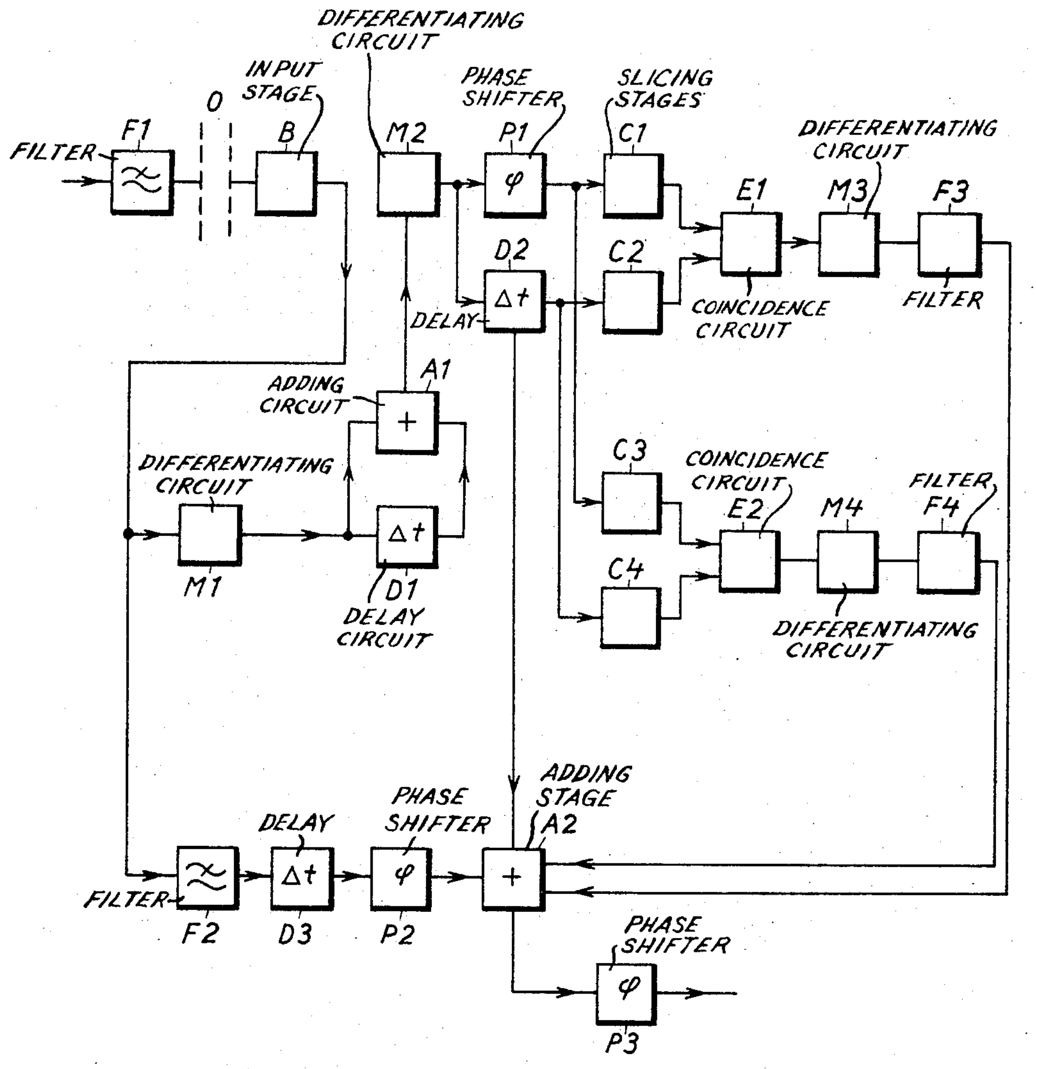

INVENTORS
Curt Danell
Peder Magnus Rodhe
BY Hane, Baxley and Spiecens
ATTORNEYS

INVENTORS
Curt Danell
Peder Magnus Rodhe
BY Hane, Baxley and Spiecens
ATTORNEYS

METHOD FOR TRANSMITTING PULSE LIKE SIGNALS

The present invention relates to a method for processing pulse signals at transmitters and receivers so that the flank slope of the transmitted pulses exceeds the flank slope transmittable in known methods by a transmission medium of only a limited bandwidth.

When transmitting pulses, the spectral or frequency components which the pulses contain must be considered. By virtue of a given bandwidth of the transmitting medium the high frequency range of the spectrum must be limited if the original pulse contains or would contain spectral components outside of, usually above, the given transmitting bandwidth.

Such a limitation is usually carried out by means of a so-called Gaussian filter having a transfer characteristic, i.e. a filter with a parabola-formed rising damping curve as a function of the frequency which gives the high frequency components such an amplitude and such a phase relation that a fairly good flank slope is obtained without simultaneously obtaining powerful overshoots.

The flank slope of a pulse transmitted in this manner can be further increased by a known method which is called "crispening." In said method a pulse obtained by a differentiation from the original pulse which is added to the original pulse.

The improvement of a pulse treated in this manner can reach a factor 2 by full modulation but this factor is normally reduced with decreasing pulse amplitude.

An essential drawback with "crispening" is that the flanks of a transmitted pulse are made steep irrespectively of whether the flanks of the original pulse were steep or not.

Such drawbacks are eliminated to an essential degree by the method according to the invention. According to this method the available bandwidth is effectively utilized when transmitting pulse like signals. The characteristics of the method appear from the characterizing part of the appendix claims. The invention will cause a transmitted pulse to agree well with the original pulse with respect to amplitude and flank slope. At the same time an improved resolution is also obtained relative to a signal transmitted in a conventional way.

The method according to the invention will be explained more in detail with reference to the accompanying drawing in which FIG. 1, as an example, shows a block diagram of an arrangement in which the method according to the invention is practiced. FIGS. 2 and 3 show the appearance of the signal in different phases of the transmission when an arrangement according to FIG. 1 is utilized.

The method according to the invention is explained in connection with the arrangement in FIG. 1. The arrangement for transmitting signals comprises at the transmitter end, a filter F1 with a distinct transition between pass-band and suppressed frequency band. This filter is connected to the transmitting medium 0 which, at the receiver end, is connected to an input stage B. After the input stage the signal path is so divided that the input stage, on the one hand, is connected to a filter F2, a delay circuit D3, a 180° phase shifter P2 and an adding stage A2 in cascade, and to which last stage other signal paths are also connected. On the other hand, the input stage B is connected to a differentiating circuit M1 which in turn is connected to an adding circuit A1 both directly and through a delay circuit D1. The adding circuit A1 is connected to a differentiating circuit M2 which is connected both to a 180° phase shifter P1 and to a delay circuit D2. This delay circuit has two outputs in which the delay need not be the same. One of the outputs is connected to the adding circuit A2 mentioned above and the other output is connected to two slicing stages C2 and C4, the outputs of which are connected respectively to one of the inputs of two coincidence circuits E1 and E2, each provided with two inputs. To the other input of these circuits E1 and E2 respectively are connected the outputs of other slicing stages C1 and C3 respectively. The inputs of these slicing stages are connected to the output of the phase shifter P1 mentioned before. The slicing stages C1 and C2 slice or remove the parts of the signal which are lower than a certain reference potential, the zero potential, that is the negative parts. The slicing stages C3 and C4 remove the parts of the signal which are higher than this potential, that is the positive parts.

The coincidence circuits E1 and E2 have similar functions and are so designed that of the signals which come in at both inputs of such a circuit, only those parts can pass through the circuit which are common with respect to time and amplitude. Each of the circuits E1 and E2 are connected to the adding circuit A2 through the differentiating circuits M3 and M4 respectively followed by the filters F3 and F4 respectively. The output of the adding circuit A2 which is provided with four inputs is connected to a 180′ phase shifter P3 at the output of which the transmitted signal is taken out.

The method according to the invention to transmit signals with pulse character by means of the arrangement in FIG. 1 includes that if for the sake of simplicity it is supposed that the signal consists of just one positive pulse (the pulse which is to be transmitted, i.e. the original pulse) and that this pulse is supplied with overshoots by the filter F1 behind the front pulse flank and behind the back pulse flank. The filter F1 which in this case is a low pass filter has a distinct transition between passband and suppressed frequency band. Moreover, the filter is so designed that its pass-band lies within the pass-band of the transmitting medium 0 and that the supplied overshoots have about the same frequency as the cut-off frequency of the filter. By a careful design of the filter the frequency of the overshoots can be made rather constant.

In other words, overshoots are supplied only after such pulse flanks which are so steep that they cannot be transmitted unchanged owing to the frequency limiting character of the transmitting medium. When a pulse flank has been supplied with overshoots this is an indication that the original pulse flank contains frequencies which are higher than the cut-off frequency of the transmitting medium and thus also higher than the cut-off frequency of the filter F1. In principle the overshoots which refer to a pulse flank consist of a damped sine wave with constant frequency.

In the following is assumed that the pulse which is to be transmitted has such a slope at the front as well as the back flank that these have been supplied with overshoots. By the transmission the flanks of the pulse to a large extend lose their steepness but the pulse is still provided with overshoots.

At the receiver end the overshoots are separated from the transmitted pulse. The separation is achieved because the transmitted pulse is fed to a low pass filter F2 where the overshoots are filtered out and to a differentiating circuit M1 by which the overshoots from the back and the front pulse flank will be brought to the same level, the zero level. At the output of the low pass filter F2 a pulse without overshoots is obtained. This pulse differs from the original pulse in that the flanks of the pulse are not as steep. The transmitted separated pulse is utilized as a base when shaping a pulse which to a considerable extend will conform to the original pulse. At the output of the differentiating circuit M1 the separated overshoots are obtained.

From the overshoots, frequency components are obtained, the amplitude-, time- and phase level of which are such that the frequency components together with the transmitted separated pulse form a new pulse which satisfactorily conforms to the original pulse.

However, at the forming of the frequency components mentioned above a certain delay will occur and in order to make the time displacement correct at the superposition mentioned above the transmitted separated pulse must be delayed in a delay circuit D3. Owing to the phase position of the obtained frequency components the transmitted separated pulse must also be phase inverted which takes place in a 180° phase shifter circuit P2. After the superposition which takes place in an adding circuit A2 the pulse is phase inverted once again in a 180° phase shifter circuit P3.

When the overshoots have been separated from the transmitted pulse by a differentiating circuit M1 as mentioned above the overshoots from the front and back pulse flanks now are at the same level.

The assumption that the original pulse was positive, i.e. that the front pulse flank was rising and the back pulse flank falling causes the first half-period of the overshoots originating from the front pulse flank to be positive and for the back flank the first half-period to be negative.

The differentiating circuit M1 is designed in such manner that the overshoots have such a form that the amplitude of the first half-period relates to the amplitude of the second half-period as the amplitude of the second half-period relates to the amplitude of the third half-period, i.e. if these amplitudes are indicated by $A_1, A_2, A_3, \ldots, A_n$ $A_1/A_2=A_2/A_3=A_3/A_4=\ldots=(A_{n-1})/A_n=k$ where $k$ is a constant.

Figure 2A:
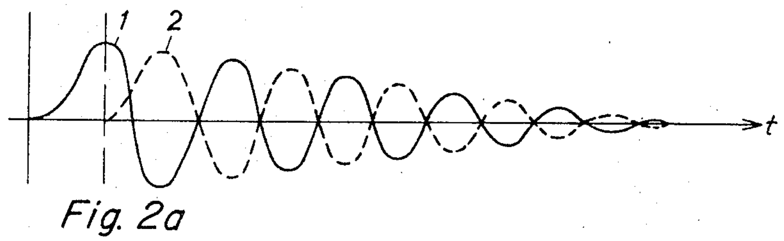

As the frequency of the overshoots is rather constant the time interval between any two adjacent amplitude maximums irrespectively of polarity is called $t_1$. The overshoots from the front pulse flank are now fed to the adding circuit A1 directly and delayed at time $t_1$ by means of the delay circuit D1. In the delay circuit the overshoots also are damped by a factor k which has the same value as said constant $k$. In FIG. 2*a* there is shown how the undelayed overshoots indicated by 1 and the delayed and damped overshoots indicated by 2 will cancel each other when superposed except for the undelayed first half-period of the overshoots which is illustrated in FIG. 2b.

Figure 2B:
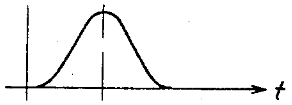

The phase position of the pulse in FIG. 2*b* indicates that the pulse flank from which it originates is a rising flank. Moreover, the amplitude is a measure of the flank steepness and the amplitude of the original pulse.

The overshoots originating from the back pulse flank causes a negative pulse and the time interval between the positive pulse originating from the original front pulse flank and the negative pulse originating from the original back pulse flank is equal to the pulse width of the original pulse.

The pulses from the adding circuit A1 are differentiated once more by differentiating circuit M2. Thus the superposition in the adding circuit A2 is accomplished symmetrically around the 50 percent of the pulse. By this method the pulse width is kept constant for when case that the front and back flank of the original pulse have different slopes.

Figure 2C:
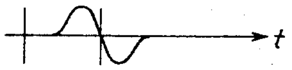

For the further treatment of the pulse shown in FIG. 2*b* and its derivative shown in FIG. 2*c* a non-linear processing is needed in order to obtain frequency components higher than the cut-off frequency of the transmitting medium.

Figure 2D:

The signal in FIG. 2*c* is now fed processed two ways. One of the ways provides a phase shift of the signal in the phase shifter P1 and the other way provides a delay of the signal in the delay circuit D2. The delay is such that if the signals which now have been fed through different ways are represented by their respective curves in the same diagram there will be a common surface between the curves and the time axis partly above this axis (marked in FIG. 2*d*) and partly below (not visible in the FIG.) In FIG. 2*d* the curve 3 represents the signal in FIG. 2c now phase inverted and the curve 4 in FIG. 2*d* represents the signal in FIG. 2*c* now delayed.

The signals originating from rising and falling pulse flanks are suitably processed separately. In order to achieve this the slicing stages C1 and C2 cut the parts of the signal which are below the zero level and at the output of the circuit E1 it will be possible to obtain the shaded part of the signal in FIG. 2*d*. In this circuit the common part of the signals from both stages C1 and C2 are then shaped, i.e. no signals from primarily falling pulse flanks will occur at the output of the circuit E1. The signal which now has been obtained is differentiating and a certain filtering of high frequencies takes place in the differentiating circuit M3 and the filter F3 whereupon the signal with the appearance which is shown in FIG. 3*d* is fed to the adding circuit A2. Signals from originally falling pulse flanks are obtained by the same principle whereby the slicing stages C3 and C4 which cut the parts of the signals which are above the zero level are utilized together with the circuit E2 for shaping of the common surface, the differentiating circuit M4 and the filter F4. The signal obtained in this way is fed to the adding circuit A2 and is shown in FIG. 3e. In order to obtain a better conformity with the original pulse at the superposition in the adding circuit A2, a signal out processing has not yet been terminated is taken from the delay circuit D2 and is fed to the adding circuit A2. This signal is shown in FIG. 3*b*.

Figure 3A:
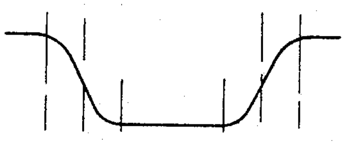
Figure 3B:
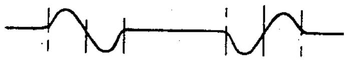
Figure 3C:
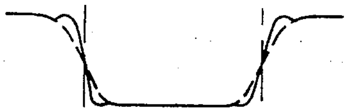
Figure 3D:
Figure 3E:
Figure 3F:

FIG. 3*a* shows the transmitted pulse which is fed to the adding circuit A2 when this pulse has been separated from the overshoots and phase inverted after the transmission. FIG. 3*c* shows the appearance of the pulse when the pulse in FIG. 3a has been superposed by the signal in FIG. 3*b*. The marked pulse in FIG. 3*c* indicates for the sake of clearness the pulse in FIG. 3*a*. FIG. 3*f* shows the appearance of the pulse when the pulse in FIG. 3c has been superposed by the signals in FIG. 3*d* and 3*e*. The marked pulse in FIG. 3*f* indicates the pulse in FIG. 3*c* so that the change can be clearly observed. It also clearly appears from the FIGS. 3*d* and 3*e* that each signal only actuates one pulse flank. This makes it possible that an original pulse with different slopes of the front and back flanks after the transmission and the reconstruction then following has different slopes of the pulse flanks.

The pulse shown in FIG. 3*f* is the one which is taken out from the adding circuit A2. As earlier mentioned this pulse is then so phase inverted that the correct phase position in relation to the original pulse is obtained. By the now described method to treat pulses when transmitting, new pulses are shaped after the transmission which well conform to the original pulses.

According to this example of the method a filter with distinct transition between pass-band and suppressed frequency band is used at the transmitter end. Naturally a filter with another characteristic can be used if the necessary steps are taken at the receiver end.

In order to obtain a still better transition between the pulse flank and the pulse top, analogously to that s signal whose processing has not yet been terminated is taken out from the delay circuit D2 and is fed to the adding circuit A2, additional incompletely processed signals can be obtained from the circuits and be fed to the adding circuit A2 by the super-position of the other signals.

We claim:

1. In a transmission system comprising a transmitter connected via a limited bandwidth transmission medium to a receiver, the method of enhancing the flanks of transmitted pulse like signals comprising the steps of: at the transmitter, adding to original pulse like signals overshoots containing information about the magnitude of the slopes of the flanks and the amplitude of such original pulse like signals and transmitting such pulse like signals with the added overshoots; and, at the receiver, separating from the received pulse like signals the added overshoots to obtain information signals related to the amplitude, time and phase positions of the overshoots and to obtain base pulse signals, modifying said information signals and adding said modified information signals to said base pulse signals to form new pulse like signals which conform to the original pulse like signals.

2. The method of claim 1 wherein the adding of overshoots is obtained by filtering the original pulse like signals with a filter having a distinct transition between a suppressed band and a pass band, said pass band being within the pass band of the transmission medium whereby the overshoots occur when the original pulse like signals contain spectral components having frequencies above the cut-off frequency of the filter.

3. The method of claim 2 wherein said modifying step comprises selecting only the first half period portions of the overshoots associated with the front and rear flanks of the pulse like signals.

4. The method of claim 3 wherein said modifying step further comprises differentiating the selected first half period portions of the overshoots.

5. The method of claim 4 wherein said modifying step further comprises differentiating the received pulse like signals.

6. The method of claim 5 wherein said adding step comprises adding the differentiated first half period portions of the overshoots at the proper times to be superimposed on the associated flanks of the base pulse signals and adding the differentiated received pulse like signals at the proper times to be superimposed on the entire base pulse signals.

* * * * *